United States Patent [19]

Yamada et al.

[11] Patent Number: 5,131,767
[45] Date of Patent: Jul. 21, 1992

[54] HALFTONE PRINTING SYSTEM

[75] Inventors: Keiki Yamada; Etsuo Hatabe; Masaru Ohnishi, all of Kamakura, Japan

[73] Assignee: Mitsubishi Denki Kabushiki Kaisha, Japan

[21] Appl. No.: 566,870

[22] Filed: Aug. 13, 1990

Related U.S. Application Data

[63] Continuation of Ser. No. 271,750, Nov. 17, 1988, abandoned.

[30] Foreign Application Priority Data

Nov. 20, 1987 [JP] Japan ................. 62-291868
Mar. 7, 1988 [JP] Japan ................. 63-51675
Mar. 7, 1988 [JP] Japan ................. 63-51676
Apr. 26, 1988 [JP] Japan ................. 63-101393

[51] Int. Cl.$^5$ ............................................. B41J 2/365
[52] U.S. Cl. .................................. 400/120; 358/298; 346/76 PH
[58] Field of Search ............. 400/120; 346/76 PH; 358/296, 298

[56] References Cited

U.S. PATENT DOCUMENTS

| | | | |
|---|---|---|---|
| 4,536,774 | 8/1985 | Inui | 400/120 |
| 4,553,173 | 11/1985 | Kawamura | 358/298 |
| 4,574,293 | 3/1986 | Inui | 400/120 |
| 4,638,332 | 1/1987 | Sakura | 346/76 PH |
| 4,639,741 | 1/1987 | Inoue | 364/519 |
| 4,663,734 | 5/1987 | Berry | 400/120 |
| 4,667,250 | 5/1987 | Murai | 358/298 |
| 4,704,618 | 11/1987 | Gotoh | 400/120 |
| 4,723,132 | 2/1988 | Matsuo | 346/76 PH |
| 4,736,253 | 4/1988 | Shida | 358/298 |
| 4,774,528 | 9/1988 | Kato | 400/120 |
| 4,777,536 | 10/1988 | Kato | 346/76 PH |
| 4,806,949 | 2/1989 | Onuma | 346/76 PH |
| 4,819,008 | 4/1989 | Nagato | 346/76 PH |

FOREIGN PATENT DOCUMENTS

| | | | |
|---|---|---|---|
| 60-9271 | 1/1985 | Japan | 400/120 |
| 62-282956 | 12/1987 | Japan | 400/120 |

Primary Examiner—David A. Wiecking
Assistant Examiner—Steven S. Kelley
Attorney, Agent, or Firm—Leydig, Voit & Mayer

[57] ABSTRACT

A halftone printing system comprising reference level generation means for generating a reference gradation level, decision means for comparing a gradation level input signal with the output signal from the reference level generation means and deciding if the gradation level input signal is greater than or equal to the reference gradation level output signal, count means for counting the number of output dots from the decision means and deliverying heat accumulation information on heat accumulated in a thermal head, and a pulse generator which generates pulses, corresponding to the gradation level input signal in accordance with the heat accumulation information from the count means.

The halftone printing system further comprises white line detection means for detecting a white line included in the input signals, white line count means for counting the number of continuous white lines in correspondence with the detected results of the white line detection means, and white line decision means for applying a predetermined signal to heat accumulation index-count means, depending upon the count value of the white line count means.

11 Claims, 15 Drawing Sheets

FIG. 5

| GROUP NO. | CUM NUM PRINT DOTS OF GRAD LEV SIGS OF OR ABOVE REF VAL | CORRECT COEF |
|---|---|---|
| 1 | 0 ~ 5120 DOTS | 1 |
| 2 | 5121 ~ 10240 DOTS | 0.98 |
| 3 | 102401 ~ 20480 DOTS | 0.96 |
| 4 | 20481 ~ 40960 DOTS | 0.95 |
| 13 | | |
| 14 | 1536000 ~ 1843200 DOTS | 0.82 |
| 15 | 1843201 ~ 2048000 DOTS | 0.81 |
| 16 | 2048000 ~ DOTS | 0.80 |

FIG. 6

| HEAT ACCUM CORRECTIONS | | GRAD LEV SIG | | | | | | | |
|---|---|---|---|---|---|---|---|---|---|
| HEAT ACCUM INFO | CUM NUM PRINT DOTS | 1-LEVEL | 2 | 3 | 4 | 5 | 6 | 7 | 8 |
| 0000 | 0 ~ 5120 DOTS | 10 PULSES | 16 | 20 | 24 | 28 | 32 | 36 | 40 |
| 0001 | 5120 ~ 10240 DOTS | 10 | 16 | 20 | 24 | 27 | 31 | 35 | 39 |
| 0010 | 10241 ~ 20480 DOTS | 10 | 15 | 19 | 23 | 27 | 30 | 35 | 38 |
| 0011 | 20481 ~ 40960 DOTS | 9 | 15 | 19 | 23 | 27 | 30 | 34 | 38 |
| 0100 | 40961 ~ 58982 DOTS | 9 | 15 | 18 | 22 | 26 | 29 | 33 | 37 |
| 0101 | | | | | | | | | |

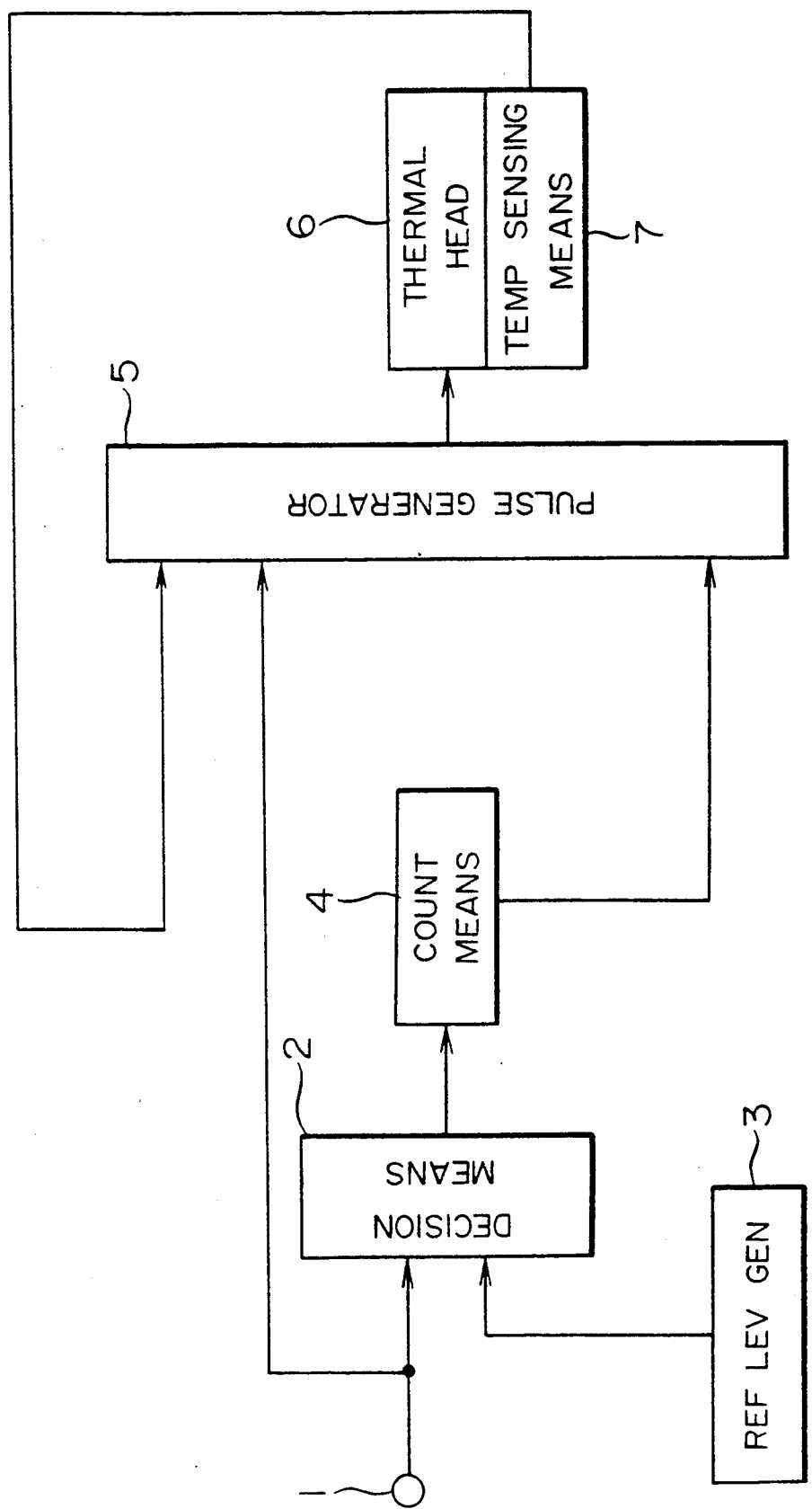

FIG. 8

| CUM NUM PRINT DOTS | | GRAD LEV | 1 | | 2 | |
|---|---|---|---|---|---|---|
| | | GROUP | | | | |
| HEAT ACCUM INFO 0000<br>DOTS 0~5120 | 1 | TEMP 0~7°C | 11 PULSES | GROUP 1 | TEMP 0~7°C | 17 PULSES |
| | 2 | TEMP 8~14°C | 11 PULSES | 2 | TEMP 8~14°C | 17 PULSES |
| | 3 | TEMP 15~21°C | 10 PULSES | 3 | TEMP 15~21°C | 16 PULSES |
| | 4 | TEMP 22~28°C | 10 PULSES | 4 | TEMP 22~28°C | 16 PULSES |
| | 5 | TEMP 29~35°C | 10 PULSES | 5 | TEMP 29~35°C | 16 PULSES |
| | 6 | TEMP 36~42°C | 9 PULSES | 6 | TEMP 36~42°C | 15 PULSES |
| | 7 | TEMP 43~48°C | 9 PULSES | 7 | TEMP 43~48°C | 14 PULSES |
| | 8 | TEMP 50°C~ | 9 PULSES | 8 | TEMP 50°C~ | 14 PULSES |
| HEAT ACCUM INFO 0001<br>DOTS 5121~10240 | GROUP 1 | TEMP 0~7°C | 11 PULSES | GROUP 1 | TEMP 0~7°C | 17 PULSES |
| | 2 | TEMP 8~14°C | 10 PULSES | 2 | TEMP 8~14°C | 10 PULSES |

LAST PRECEDING LINE

PRINTING LINE

FIG.18(A)

| TABLE 1 ||
|---|---|
| GRAD LEV | GROUP NO. |
| 1 ~ 16 | 0 |
| 17 ~ 32 | 1 |
| 33 ~ 48 | 2 |
| 49 ~ 64 | 3 |

FIG.18(B)

| TABLE 2 |||
|---|---|---|
| GROUP | THERM INFL INDEX | CORRECT COEF |
| 1 | 0 ~ 5 | 1 |
| 2 | 6 ~ 10 | 0.98 |
| 3 | 11 ~ 14 | 0.96 |
| ? | ? | ? |
| 6 | 19 ~ 21 | 0.90 |
| 7 | 22 ~ 26 | 0.88 |
| 8 | 27 ~ 30 | 0.86 |

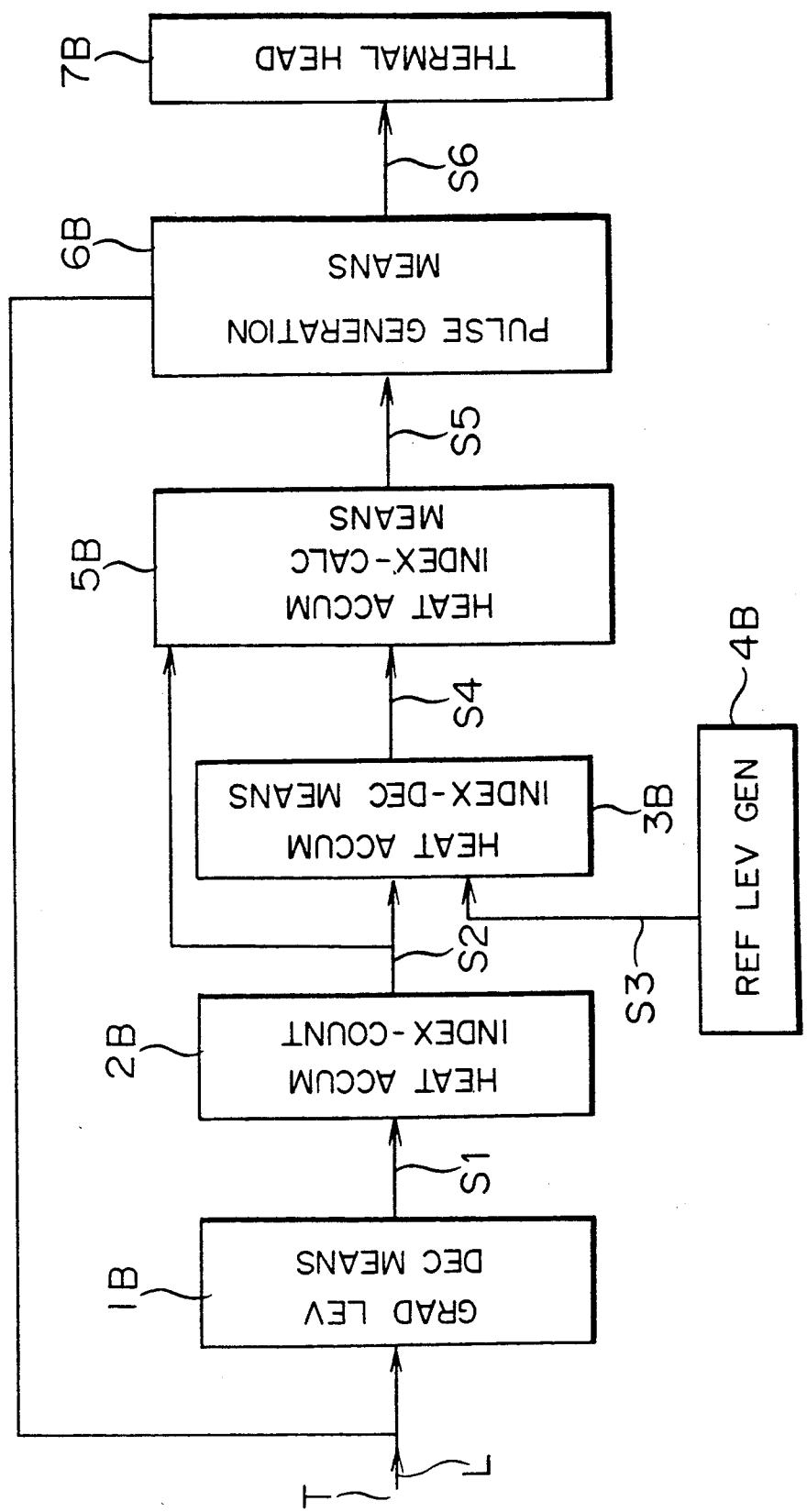

(TABLE IC)

| GROUP | GRAD LEVEL SIG | HEAT ACCUM INDEX |
|---|---|---|
| 1 | 1 ~ 8 | 0 |
| 2 | 9 ~ 16 | 0.4 |
| 3 | 17 ~ 32 | 0.8 |
| 4 | 33 ~ 64 | 1 |

FIG. 23
(TABLE 2C)

| GROUP NO. | CUM HEAT ACCUM INDEX | CORREC COEF |
|---|---|---|
| 1 | 0 ~ 5120 | 1 |
| 2 | 5121 ~ 10240 | 0.98 |
| 3 | 10241 ~ 20480 | 0.96 |
| 4 | | 0.95 |
| 12 | 1136001 ~ 1336000 | |
| 13 | 1336001 ~ 1536000 | 0.83 |
| 14 | 1536001 ~ 1843200 | 0.82 |
| 15 | 1843201 ~ 2048000 | 0.81 |
| 16 | 2048001 ~ | 0.80 |

FIG. 24

(TABLE 3C)

| HEAT ACCUM CORREC || GRAD LEVEL |||||||| 
|---|---|---|---|---|---|---|---|---|
| GROUP NO. | CORREC COEF | LEVEL 1 | 2 | 3 | 4 | 5 | 6 | 7 | 8 |
| 1 | 1 | 10 | 16 | 20 | 24 | 28 | 32 | 36 | 40 |
| 2 | 0.98 | 10 | 16 | 20 | 24 | 27 | 31 | 35 | 39 |
| 3 | 0.96 | 10 | 15 | 19 | 23 | 27 | 30 | 35 | 38 |
| 4 | 0.95 | 9 | 15 | 19 | 23 | 27 | 30 | 34 | 38 |
| 5 | 0.94 | 9 | 15 | 18 | 22 | 26 | 29 | 33 | 37 |

HALFTONE PRINTING SYSTEM

This application is a continuation of application Ser. No. 07/271,750, filed Nov. 17, 1988, now abandoned.

BACKGROUND OF THE INVENTION

1. Field of the Invention

This invention relates to a halftone printing system for thermal printing and thermal transfer printing. More particularly, it relates to a halftone printing system in which the change of printing density attributed to the heat accumulation hysteresis of a thermal head can be corrected, to thereby faithfully reproduce the density corresponding to each gradation level.

2. Description of the Prior Art

Since a conventional thermal printing device or thermal transfer printing device has a comparatively simple construction, it is extensively applied to various kinds of printing means such as printers, copying machines, and facsimile sets. In such various printing means, the method of thermal transfer printing with a sublimation type inked sheet, for example, is sometimes used for the printing of halftones. The thermal transfer printing method performs required printing in such a way that dye ink is sublimated in correspondence with the quantity of heat applied by heating resistors which constitute the thermal head, whereupon the sublimated dye ink is transferred onto a paper. Here, the heating resistors have their heating quantity controlled by the number and duration of electric pulses applied thereto.

The thermal transfer printing method is easy to control, and can achieve comparatively good halftone printing. In the halftone printing, however, the main factor which determines the printing densities of a plurality of gradation levels is the temperature of the heating resistors constituting the thermal head. Therefore, the printing density of each gradation level is greatly affected by changes in ambient temperature and temperature fluctuation ascribable to the heat accumulation of the heating resistors. Thus, it is difficult to perform faithful halftone printing, and a large number of correcting methods have hitherto been proposed.

A halftone printing system in the prior art is disclosed in, for example, Japanese Patent Application Laid-open No. 60-9271. FIGS. 1 and 2 are diagrams for explaining the operation of this prior-art system.

First, FIG. 1 is a waveform diagram of electric pulses (hereinbelow, called a "strobe signal") which serve to heat heating resistors constituting a thermal head in the prior-art system. Here, symbol $t_w$ denotes the pulse width of the strobe signal, symbol $t_p$ the repetition period of the strobe signal, and letter n the number of pulses of the strobe signal used. Further, the number of pulses of the strobe signal to be used is previously selected and set in correspondence with the density of each gradation level, and a case where the number is 3 is illustrated in FIG. 1.

Next, FIG. 2 is a diagram of the relationship of the prior-art system between the pulse width of the strobe signal applied to the heating resistor and the temperature of the heating resistor. Here, the pulse width $t_w$ of the strobe signal is the ordinate, while a changeable temperature such as ambient temperature is the abscissa. By controlling the pulse width of the strobe signal in correspondence with the temperature change, an energization or heating time for the heating resistors constituting the thermal head is shortened in inverse proportion to the temperature rise, and the temperature at the identical gradation level can be always held constant.

In the operation of the prior-art system, even when the number of corresponding pulses is fixed in order to attain a certain desired gradation level, the printing density sometimes fluctuates under the influence of the temperature in the heating resistors constituting the thermal head. That is, notwithstanding that the number of pulses corresponding to the gradation level remains constant, the printing density becomes different. Therefore, while the temperature change of the ambient temperature etc. is being monitored every line of printing by means of an affixed appropriate temperature sensor such as a thermistor (not shown), the pulse width $t_w$ of the strobe signal is controlled in the aspect as shown in FIG. 2. In this way, corrections are made so as to attain equal printing densities at a certain desired gradation level by the same number of pulses.

SUMMARY OF THE INVENTION

The prior-art halftone printing system is constructed and operated as described above. Since, however, the time constant of the thermistor or the like for use in monitoring the temperature is, in general, on the order of several seconds, the prior-art system has had the problem that the heating temperature in the thermal head which changes at a time constant of from several tens of $\mu$s to several ms cannot be precisely corrected and controlled while being monitored by such a thermistor or the like. Especially in a case where a printing operation of high speed is required and where the printing cycle thereof is as short as about 10 ms by way of example, there has also been the problem that the influence of thermal hysteresis based on the past printing operation, the influence of heat generation by an adjacent heating resistor within the thermal head at the printing line, etc. cannot be neglected, so it becomes next to impossible to faithfully reproduce the respective printing densities of a plurality of graduation levels.

This invention has been made in order to solve the problems as stated above, and has for its object to provide a halftone printing system in which temperature fluctuations ascribable to the influence of thermal hysteresis based on a past printing operation, the influence of heat generated by an adjacent heating resistor within a thermal head at a printing line, etc. can be appropriately corrected, thereby to faithfully reproduce the printing densities of respective gradation levels.

BRIEF DESCRIPTION OF THE DRAWINGS

FIG. 5 is a table showing the relationships between the cumulative numbers of printing dots and correction coefficients for individual groups in the first embodiment;

FIG. 6 is a table showing the relationships between heat accumulation corrections and gradation level signals in the first embodiment;

FIG. 7 is a block diagram showing a halftone printing system which is the second embodiment of this invention;

FIG. 8 is a table showing the relationships between the cumulative numbers of printing dots and gradation level signals for individual groups in the second embodiment;

FIGS. 18(A) and 18(B) are tables for explaining the operation of the third embodiment;

FIG. 19 is a block diagram showing a halftone printing system which is the fourth embodiment of this invention;

FIG. 23 is a table showing the corresponding relationships between cumulative heat accumulation indices and correction coefficients in the fifth embodiment; and FIG. 24 is a table showing the corresponding relationships between the cumulative heat accumulation indices as well as the correction coefficients and gradation levels in the fifth embodiment.

PREFERRED EMBODIMENTS OF THE INVENTION

Embodiment 1

Figure 3:
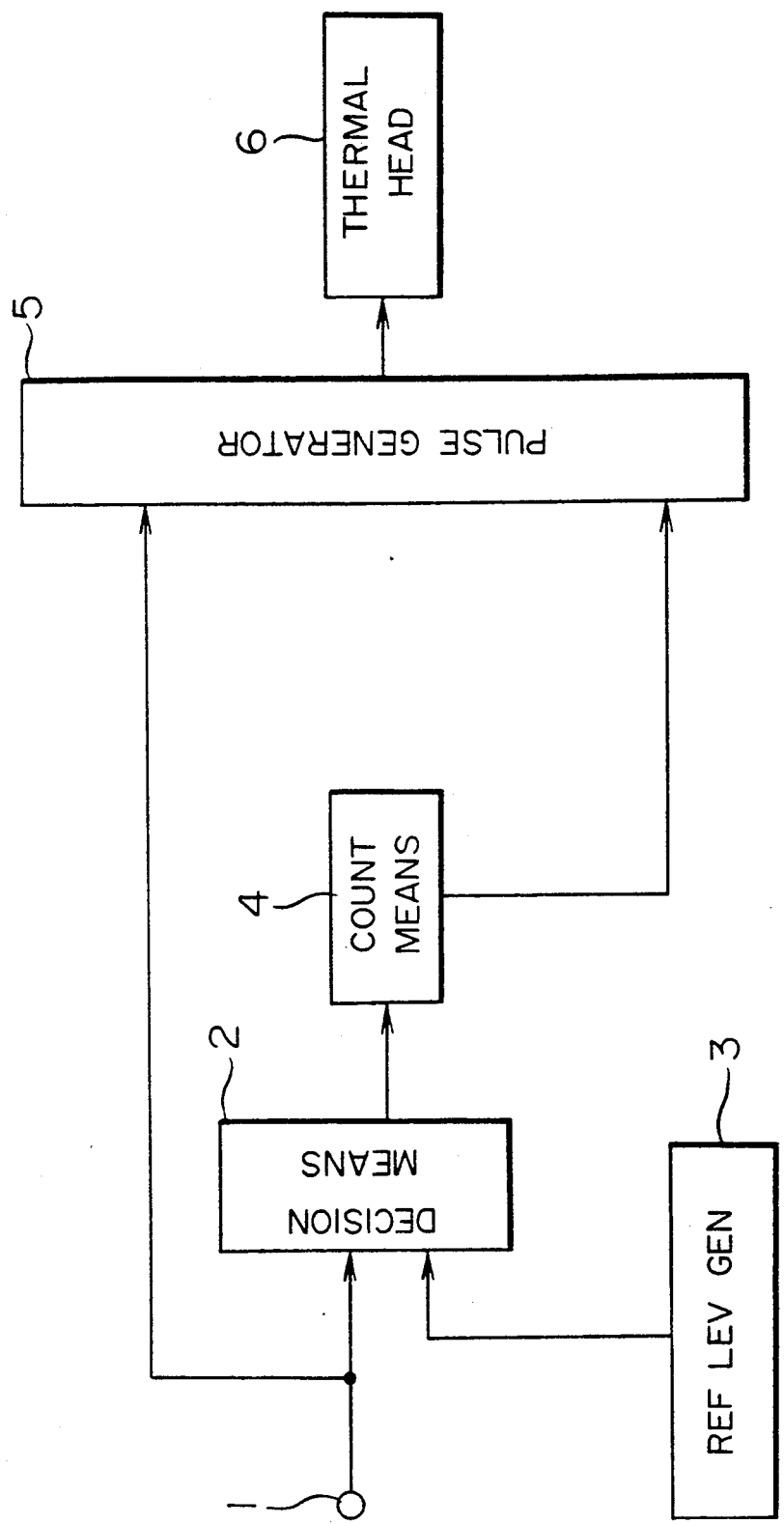
FIG. 3 is a block diagram showing a halftone printing system which is the first embodiment of this invention.

FIG. 3 is a block diagram showing a halftone printing system according to the first embodiment of this invention. Referring to the figure, numeral 1 indicates a gradation level signal-input terminal to which a gradation level signal composed of 6 bits is applied, and numeral 2 indicates decision means which has its input side connected with the gradation level signal-input terminal 1 and a reference level generator 3 stated below, so as to decide if the input signal is not less than a reference gradation level signal. The reference level generator 3 delivers the reference gradation level to the decision means 2. Numeral 4 denotes a count means, which has its input side connected with the output side of the decision means 2 and counts the number of dots over the reference gradation level signal, so as to deliver heat accumulation information of 4 bits. Shown at numeral 5 is a pulse generator, which has its input side connected with the input terminal 1 and the count means 4 and generates pulses in a number corresponding to the gradation level signal applied to the input terminal 1, in accordance with the heat accumulation information from the count means 4. A thermal head 6 is connected with the pulse generator 5, and it is configured of a number of heating resistors, for example 1024.

Figure 1:
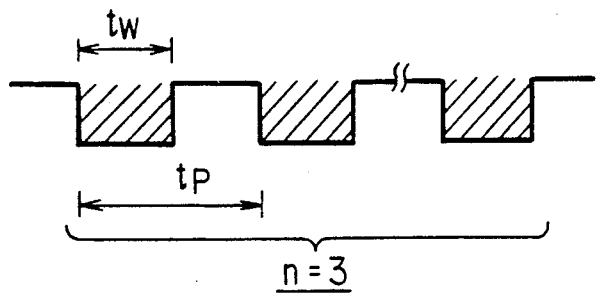
FIGS. 1 and 2 are diagrams for explaining the operation of a halftone printing system in a prior art.
Figure 2:
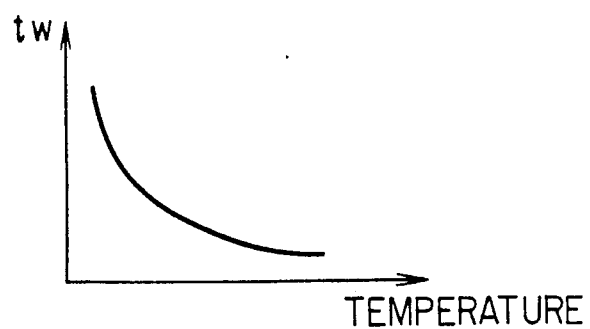
Figure 4:
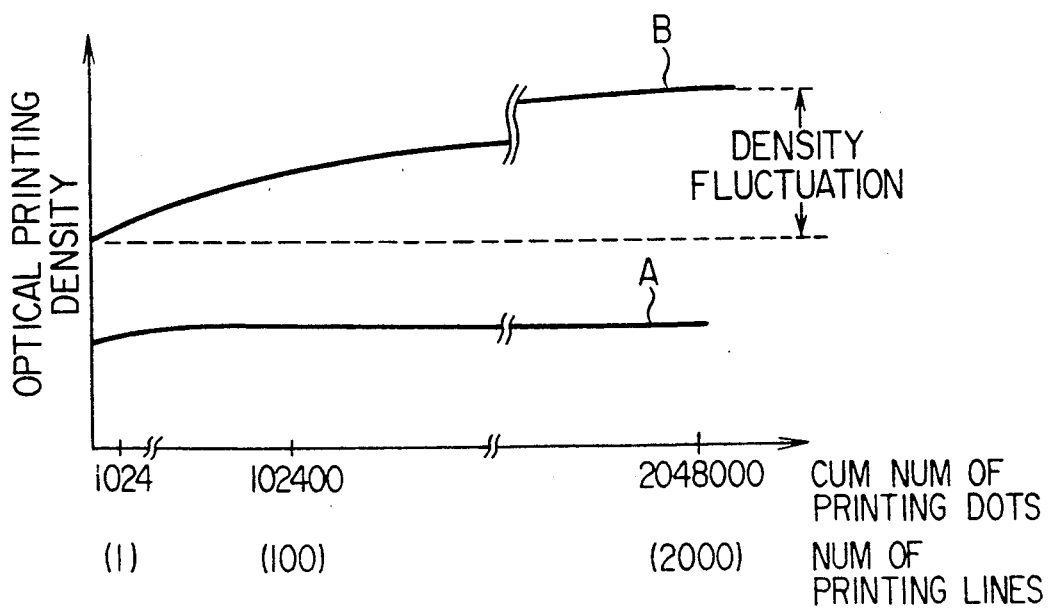
FIG. 4 is a graph showing the relationships between the density of printing and the cumulative number of printing dots in the first embodiment.

FIG. 4 is a graph showing the relationship between the optical printing density and the cumulative number of printing dots. In the figure, curve A corresponds to a case where the whole area was printed at Gradation Level 20, while curve B corresponds to a case where the whole area was printed at Gradation Level 64.

Before the description of the operation of the halftone printing system constructed as stated above, the principle of this invention will be elucidated with reference to FIG. 4.

Referring to FIG. 4 illustrative of the relationship between the printing density and the cumulative number of printing dots, in the case where the whole area is printed at Gradation Level 64 as indicated by curve B, the quantity of heat accumulation increases with increases in the cumulative number of printing dots, with the result that the printing density rises greatly. In contrast, in the case where the whole area is printed at Gradation Level 20 as indicated by curve A, the printing density hardly changes in spite of increases in the number of printing dots. The case of curve A indicates that, since the heating resistors are caused to generate heat at the low gradation level, the quantity of heat accumulation is small, so the accumulation of heat need not be considered on such an occasion. With note taken of such a phenomenon, this invention consists in counting gradation level signals of or above a reference value that arise from the starting point of printing till the point of time immediately before a printing line, and then compensating the quantity of heat accumulation of the thermal head in accordance with the lapse of printing since the start of the printing. FIG. 5 is a table showing the relationships between the cumulative numbers of printing dots and correction coefficients for individual groups. The sum totals of the gradation level signals of or above the reference value are classified into 16 groups, and the heat accumulation correction coefficients are determined for the respective groups beforehand. By way of example, in a case where the cumulative number of printing dots is 20480, which belongs to Group 3, the heat accumulation correction coefficient is 0.96. Thus, the number of energization or heating pulses corresponding to a gradation level applied as an input is limited to 0.96 time thereby to prevent the heat accumulation from occurring.

Next, the operation of the first embodiment of this invention will be described with reference to FIG. 3.

The gradation level signals each expressing any of Gradation Levels 1-64 are successively input to the decision means 2 through the gradation level signal-input terminal 1. The decision means 2 serves to decide whether or not the gradation level signal is at least equal to the reference value. It supplies information "1" to the count means 4 if the gradation level signal is not less than the reference value delivered from the reference level generator 3, whereas it supplies information "0" if the gradation level signal is less than the reference value. The count means 4 counts the outputs of the decision means 2, and supplies the pulse generator 5 with the heat accumulation information of 4 bits corresponding to the counted result. In accordance with the heat accumulation information, the pulse generator 5 delivers pulses in a number corresponding to the input gradation level signal, so as to control the thermal head 6. Here, in the pulse generator 5, a table is prepared showing the relationship among the gradation level signals, the heat accumulation information and the numbers of pulses as depicted in FIG. 6. By way of example, if the cumulative number of printing dots is not larger than 5120 in case of Gradation Level 8 in FIG. 6, no heat accumulation is deemed to occur, and the thermal head 6 is controlled with a reference value (40 pulses) without making corrections. Further, in case of attaining Gradation Level 8 when the cumulative number of printing dots is 10000, the thermal head 6 is controlled with a value (39 pulses) which is obtained in such a way that the reference value (40 pulses) is multiplied by a heat accumulation correction coefficient (0.98).

The reference values and the heat accumulation correction coefficients differ depending upon the thermal response characteristics of the thermal head 6, etc., and can be readily found by a simple printing experiment or from the results of heat calculations.

Also, although the number of the groups of the cumulative numbers of printing dots was set at 16 in the first embodiment, it is set in consideration of the characteristics of the thermal head, etc.

In addition, although the changes in heat accumulation have been coped with by correcting the number of pulses in the first embodiment, an effect similar to that of the first embodiment is brought forth even by correcting the width of a pulse instead of the number of pulses.

Embodiment 2

Next, FIG. 7 shows the second embodiment of this invention. The embodiment in FIG. 7 is identical to the embodiment in FIG. 3 except that temperature sensing means 7 is disposed anew in the vicinity of the heating resistors (not shown) of the thermal head 6. The temperature sensing means 7 is constructed of thermistors or the like, each of which subjects a sensed analog quantity to A/D (analog-to-digital) conversion and delivers the resulting temperature information to the pulse generator 5.

In operation, immediately before printing is started, the temperature information of the temperature sensing means 7 is input to the pulse generator 5. Here, the temperature information is held constant within one frame of the printing. Thenceforth, the heat accumulation information being output of the count means 4 is input to the pulse generator 5 as in the operation of the first embodiment in FIG. 3. In accordance with the temperature information and the heat accumulation information, the pulse generator 5 delivers pulses in a number corresponding to each input gradation level signal, so as to control the thermal head 6. Here, the pulse generator 5 determines the number of pulses in accordance with a matrix table among the temperature information, the heat accumulation information and the gradation level signals, namely, a table showing the relationships between the cumulative numbers of printing dots and the gradation level signals in the second embodiment of this invention, as depicted in FIG. 8. Therefore, a control of still higher accuracy is possible.

Embodiment 3

Figure 9:
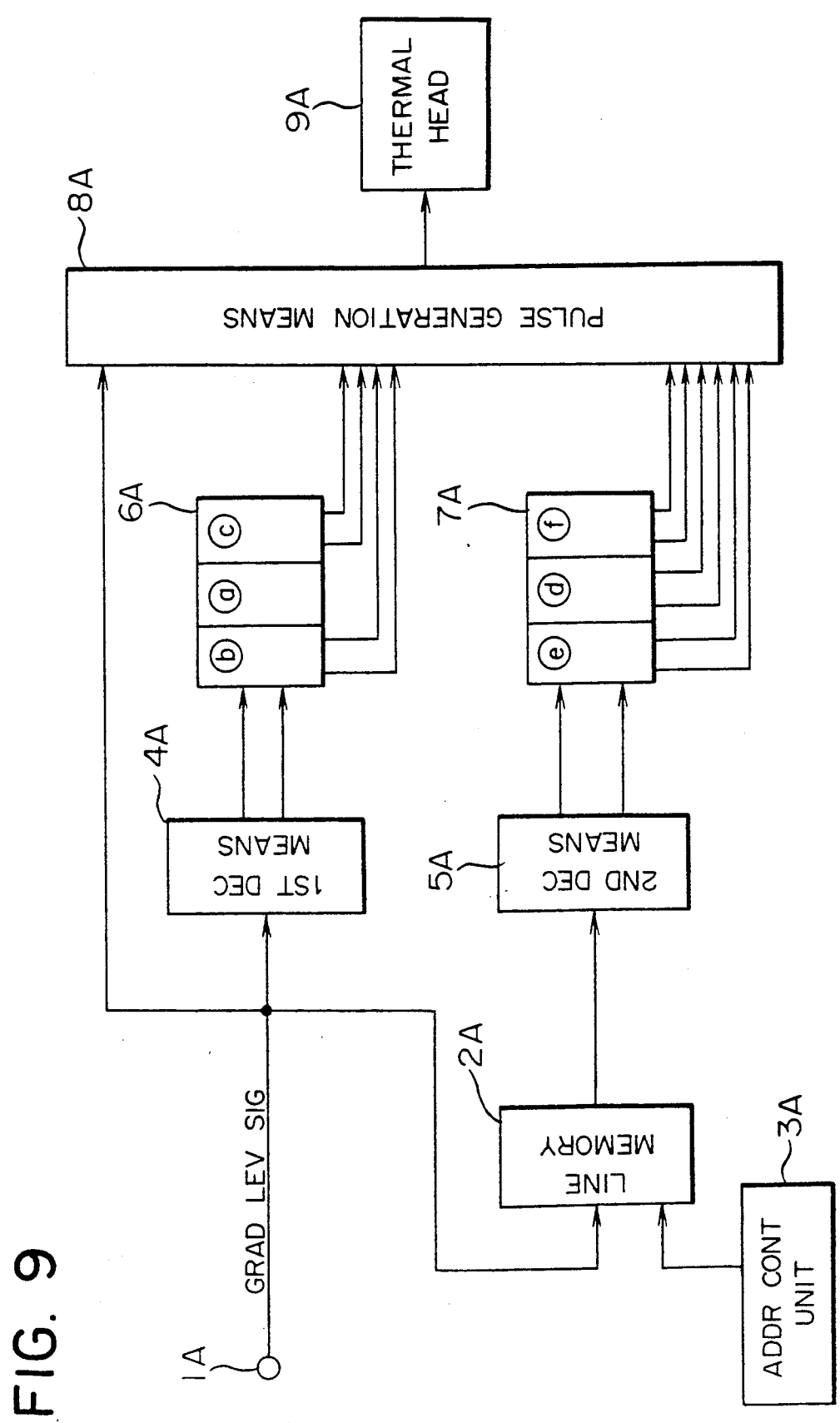
FIG. 9 is a block diagram showing a halftone printing system which is the third embodiment of this invention.

FIG. 9 is a schematic block diagram showing a half-tone printing system which is the third embodiment of this invention. Referring to the figure, any of gradation level signals of, for example, 64 gradation levels is applied to an input terminal 1A, and it is supplied to a line memory 2A, first decision means 4A and pulse generation means 8A. The line memory 2A stores the input gradation level signals for one line. An address control unit 3A for controlling the address of the line memory 2A is connected to the other input terminal of this line memory 2A, the output terminal of which is coupled to the input terminal of second decision means 5A. The output terminals of the first decision means 4A are coupled to the input terminals of the second decision means 5A are coupled to the input terminals of a second shift register 7A. Also, the output terminals of the first and second shift registers 6A and 7A are respectively coupled to the input terminals of the pulse generation means 8A, the output terminal of which is coupled to the side of a thermal head 9A. Further, the thermal head 9A is configured of 1024 heating resistors by way of example.

Figure 12:
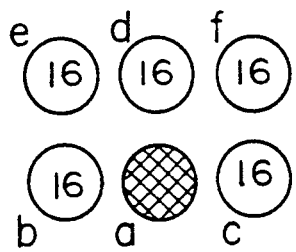
Figure 13:
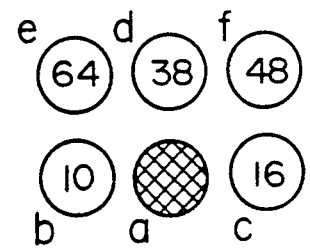
Figure 14:
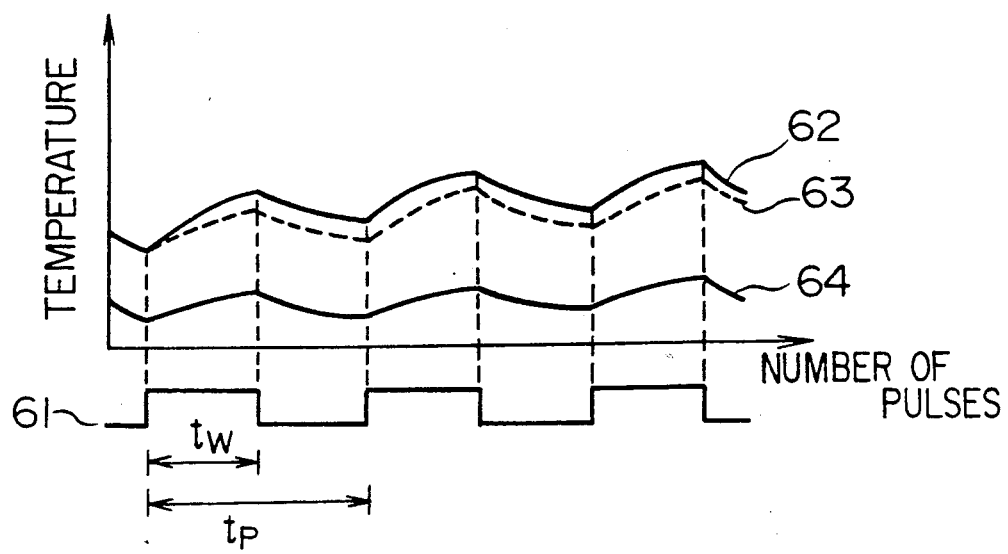
Figure 15:
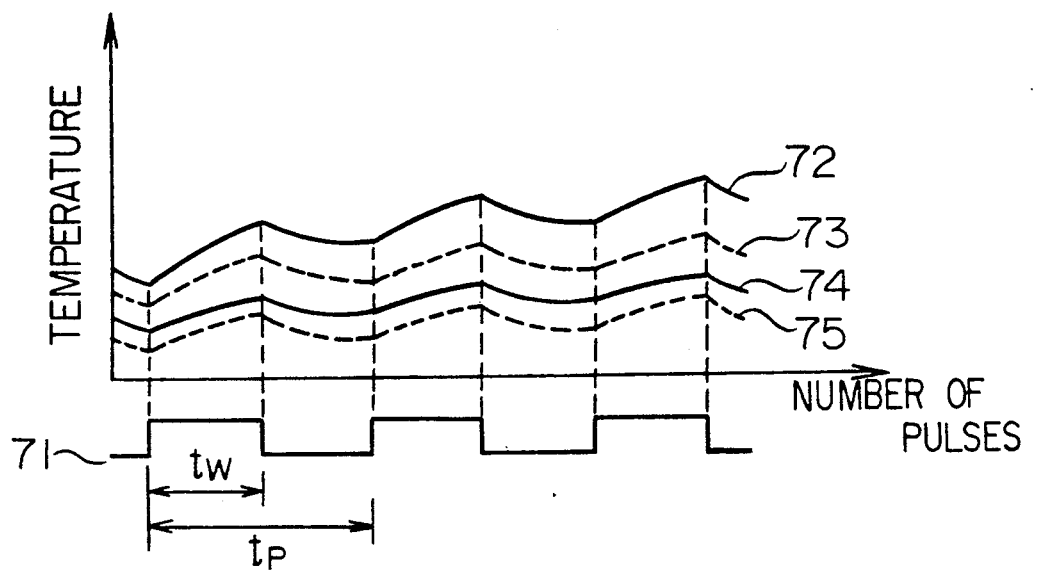
Figure 16:
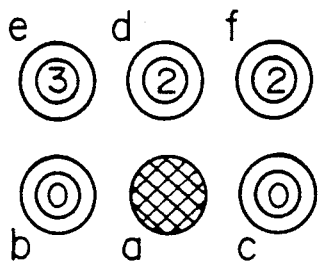
Figure 17:
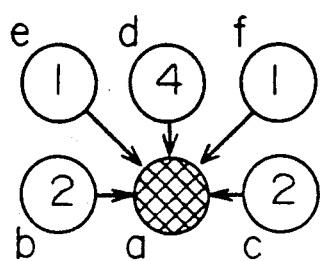

FIGS. 10 through 17 are diagrams for explaining the principles of the operations of the third embodiment. Among them, FIGS. 10 through 13 are diagrams each exemplifying the printing patterns of a directly preceding line and a current printing line, FIGS. 14 and 15 are diagrams each exemplifying the temperature change of a heating resistor which constitutes the thermal head, FIG. 16 is a diagram exemplifying printing patterns in the case where the 64 gradation levels are divided into 4 groups, and FIG. 17 is a diagram exemplifying the extent of thermal influences which reference heating resistors exert on the noted heating resistor. In addition, FIGS. 18(A) and 18(B) are diagrams showing tables for explaining the operation of the third embodiment, in which Table 1 in FIG. 18(A) exemplifies the grouping of gradation levels, and Table 2 in FIG. 18(B) exemplifies correction coefficients corresponding to grouped thermal influence indices. The reference heating resistors and the subject heating resistor will be explained later.

Figure 10:
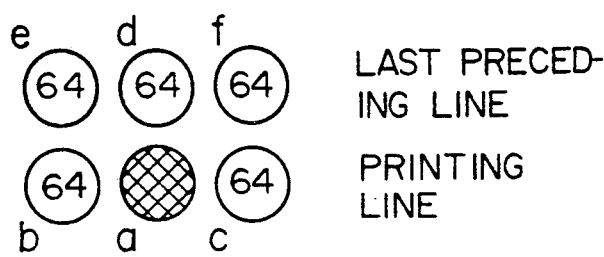
FIGS. 10 through 17 are diagrams for explaining the principles of the operations of the third embodiment.
Figure 11:
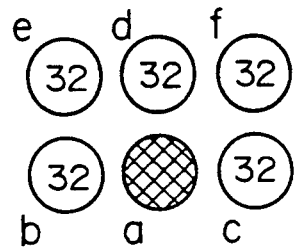

Next, before the description of the operation of the third embodiment shown in FIG. 9, the principles of the operation will be elucidated along FIGS. 10 through 17. Referring to FIG. 10 which exemplifies the printing patterns of the directly preceding line and the current printing line, letters a, b and c exemplify the printing patterns of the current printing line, in which a corresponds to one subject heating resistor, and b and c correspond to left and right adjacent heating resistors, respectively. Besides, letters d, e and f exemplify the printing pattern directly preceding the current printing line, and they indicate the printing states of heating resistors adjacent to the heating resistors a, b and c in the last line, respectively. In FIG. 10, a numeral within each circle denotes a gradation level in the case of a printing operation, and Gradation Level 64 is taken as an example here. In the ensuing description, the heating resistors b–f adjacent to the noticed heating resistor a shall be called "reference heating resistors". As will be stated later, the noticed heating resistor a undergoes the thermal influences of the reference heating resistors b–f, and this forms a cause for rendering the printing density of the noticed heating resistor nonuniform. Since FIGS. 11 through 13 are similar to the case of FIG. 10, they shall not be described in detail.

FIG. 14 exemplifies the temperature changes of the noticed heating resistor among the heating resistors constituting the thermal head, as to the case of FIG. 10. In FIG. 14, the number of heating pulses is represented along the abscissa axis, while the temperature change is along the axis of ordinates. Also in FIG. 14, numeral 61 denotes the heating pulse, the energization or heating time for the thermal head of which is expressed by $t_w$, and the period of which is expressed by $t_p$. Here:

Curve 62: temperature change waveform in the case where all the reference heating resistors b–f adjacent to the subject heating resistor a are caused to heat under the condition of Gradation Level 64 as illustrated in FIG. 10;

Curve 63: temperature change waveform in the case where the subject heating resistor a and the reference heating resistors d–f are caused to heat under the condition of Gradation Level 64; and Curve 64: temperature change waveform in the case where only the subject heating resistor a is caused to heat.

In this manner, it is recognized that the temperature of the subject heating resistor itself changes according to the presence or absence of the past and present printing operations. Under the influences of the temperature changes, the printing density becomes nonuniform.

FIG. 15 exemplifies the temperature changes of the subject heating resistor among the heating resistors constituting the thermal head, as in the cases of FIGS. 10 through 12. In FIG. 15, the number of heating pulses is represented along the abscissa axis, while the temperature change is along the ordinate axis. Also in FIG. 15, numeral 71 denotes the heating pulse, the heating time for the thermal head of which is expressed by $t_w$, and the period of which is expressed by $t_p$. Here:

Curve 72: temperature change waveform in the case where all the reference heating resistors b-f adjacent to the subject heating resistor a are caused to heat under the condition of Gradation Level 64, likewise to the curve 62 in FIG. 14;

Curve 73: temperature change waveform in the case where all the reference heating resistors b-f adjacent to the subject heating resistor a are caused to heat under the condition of Gradation Level 32, as illustrated in FIG. 11;

Curve 74: temperature change waveform in the case where only the subject heating resistor a is caused to heat under the condition of Gradation Level 64, and where all the adjacent reference heating resistors b-f are caused to heat under the condition of Gradation Level 16 as illustrated in FIG. 12; and Curve 75: temperature change waveform in the case where only the subject heating resistor a is caused to heat, likewise to the curve 64 in FIG. 14.

Now, curve (72) and curve (75) are the same as the curve (62) and curve (64) respectively, when heating pulse (61) is equal to (71).

In this manner, it is recognized that the temperature of the subject heating resistor itself is greatly changed according to the extent of the gradation levels in the printing operations, in addition to the presence or absence of the operations, in the past and present printing patterns. Under the influence of the temperature changes, the printing density becomes nonuniform.

Meanwhile, when the relationships between the temperature of the subject heating resistor and the heating pulses are sought with the various gradation levels as a parameter, results based on a very large number of combinations are obtained. By way of example, letting M denote the number of the reference heating resistors (5 in this example) and N denote the number of the gradation levels (64 in this example), there are $N^M$ ($64^5$ in this example) combinations, and hence, a very large number of results corresponding thereto are obtained. Ordinarily, however, the results include ones which may be deemed to have nearly the same characteristics, and they can be classified into a suitable number of groups by unifying nearly equal results.

This invention has been made with note taken of the feature as described above. More specifically, gradation level signals to be handled are classified into a plurality of (n) groups, n being not larger than the number (N) of gradation levels, and electrical energy to be applied to a subject heating resistor is optimized on the basis of the cumulative result (termed "thermal influence index") of products each being taken between the group No. given to each individual gradation level and a numerical value corresponding to the group No. as indicates the extent of thermal influence exerted on the subject heating resistor.

The way of grouping the gradation level signals and setting the thermal influence indices differ depending upon the relative positional relations between the subject heating resistor and reference heating resistors, the thermal response characteristics thereof, printing cycle, etc., but they can be easily obtained empirically through simple experiments, heat calculations, or the like.

Table 1 in FIG. 18(A) shows an example of the grouping of the gradation levels, and it corresponds to a case where 64 gradation levels are used and where a resolution of 8 dots/mm and a printing cycle of 5 ms/line are set as conditions.

FIG. 13 is a diagram exemplifying printing patterns having the same meaning as in FIGS. 10 through 12. It is indicated that each of the reference heating resistors b-f is subjected to a printing operation at a gradation level corresponding to a numerical value within a circle. In addition, FIG. 16 shows group Nos. corresponding to the reference heating resistors in the case where the grouping for the printing of the printing patterns in FIG. 13 is performed according to Table 1.

Further, FIG. 17 is a diagram showing the extent of thermal influences which the reference heating resistors b-f exert on the subject heating resistor a. Here, among the thermal influences on the subject heating resistor a, that of the reference heating resistor d is the greatest, and "4" is given as the degree of the greatest thermal influence. In contrast, the reference heating resistors e and f have little thermal influence on the subject heating resistor a, so that "1" is given as the degree of thermal influence.

The numerical value indicating the degree of thermal influence and the group No. corresponding to the gradation level as indicated in FIG. 16 are multiplied to every reference heating resistor, and the cumulative result of such products is set as the thermal influence index for the subject heating resistor a.

By way of example, the thermal influence index concerning the printing patterns in FIG. 13 becomes 13 as the cumulative sum of the products of the corresponding numerical values in FIG. 16 and 17, as follows:

$$13 = 0 \times 2 + 0 \times 2 + 2 \times 4 + 3 \times 1 + 2 \times 1$$

Here, the thermal influence indices in a range in which they can be adopted are 31 indices from 0 to 30 inclusive. However, some of these indices can be regarded as being included in the same patterns when the symmetry of heat distribution, etc. is considered. Therefore, the indices can be classified into 8 groups by way of example.

Table 2 in FIG. 18(B) lists up the thermal influence indices classified into the 8 groups, and correction coefficients corresponding to the respective groups. Here, the "correction coefficient" serves to eliminate the thermal influences by the reference heating resistors and to stabilize the printing density of the noticed heating resistor.

As to the case of the printing patterns in FIG. 13, the thermal influence coefficient is 13, and hence, the correction coefficient of 0.96 for the third group in Table 2 is adopted. Accordingly, the number of pulses to be impressed on the heating resistor in order to attain a desired gradation level is multiplied by 0.96, whereupon the subject heating resistor is heated.

Next, the operation of the third embodiment shown in FIG. 9 will be described. As an initial state, all of the contents of the line memory 2A and the first and second shift registers 6A, 7A are cleared to "0". The gradation level signals 1A each expressing any of Gradation Levels 1-64 are supplied to the line memory 2A, the first decision means 4A and the pulse generation means 8A in succession. Here, the line memory 2A functions as a kind of delay means, and the gradation level signal 1A applied as the input is endowed with a delay corresponding to one line and is then delivered to the second decision means 5A at the succeeding stage. Also, the first decision means 4A delivers a group number of 2 bits corresponding to the input gradation level signal 1A, and such group Nos. are successively supplied to the first shift register 6A. Likewise, the gradation level signal 1A from the line memory 2A as precedes one line is applied to the second decision means 5A and is turned into a corresponding group number, which is supplied to the second shift register 7A. The first and second shift registers 6A and 7A are respectively configured of three stages; stages b, a and c and stages e, d and f, among which the stages b, c, e, d and f produce output signals to be applied to the pulse generation means 8A. Here, the stage configurations of the first and second shift registers 6A and 7A correspond to the aspect of the arrangement of the heating resistors in FIGS. 10 et seq. The pulse generation means 8A is constructed of a ROM. It receives the gradation level signal 1A, and the outputs from the first and second shift registers 6A and 7A as address signals, whereupon it reads the correction coefficient which has been stored beforehand on the basis of the thermal influence index and in correspondence with which the thermal head 9A is energized to generate heat.

Although the third embodiment has been described as to the case where the two heating resistors adjacent to the subject heating resistor and the three heating resistors of the preceding line, totaling the five resistors, are used as the reference heating resistors, the number of the reference heating resistors is not restricted to 5. Also, in the third embodiment, the number of the groups corresponding to the gradation levels has been set at 4, and the number of the groups corresponding to the thermal influence indices has been set at 8. However, the number of the groups are not restricted thereto, but they can be set at will on the basis of the characteristics of the thermal head to be used, etc. Further, control of still higher accuracy is attained by performing ambient temperature corrections, etc. in addition to the thermal influence corrections in this embodiment.

Embodiment 4

FIG. 19 is a block diagram showing the fourth embodiment of this invention. Referring to the figure, symbol 1B denotes gradation level decision means connected to an input terminal T. Symbol 2B denotes count means, and in the fourth embodiment, it is a heat accumulation index-counter which is connected to the gradation level decision means 1B at the preceding stage. Components 3B-5B constitute arithmetic means, and in this embodiment, the component 3B is heat accumulation index-decision means connected to the heat accumulation index-counter 2B at the preceding stage, the component 4B is a reference level generator connected to the heat accumulation index-decision means 3B, and the component 5B is heat accumulation index-calculation means connected to the heat accumulation index-decision means 3B at the preceding stage. Shown at symbol 6B is pulse generation means connected to the heat accumulation index-calculation means 5B and the input terminal T. A thermal head 7B is connected to the pulse generation means 6B, and is configured of a number of heating resistors, for example, 1024.

Figures 20, 22:
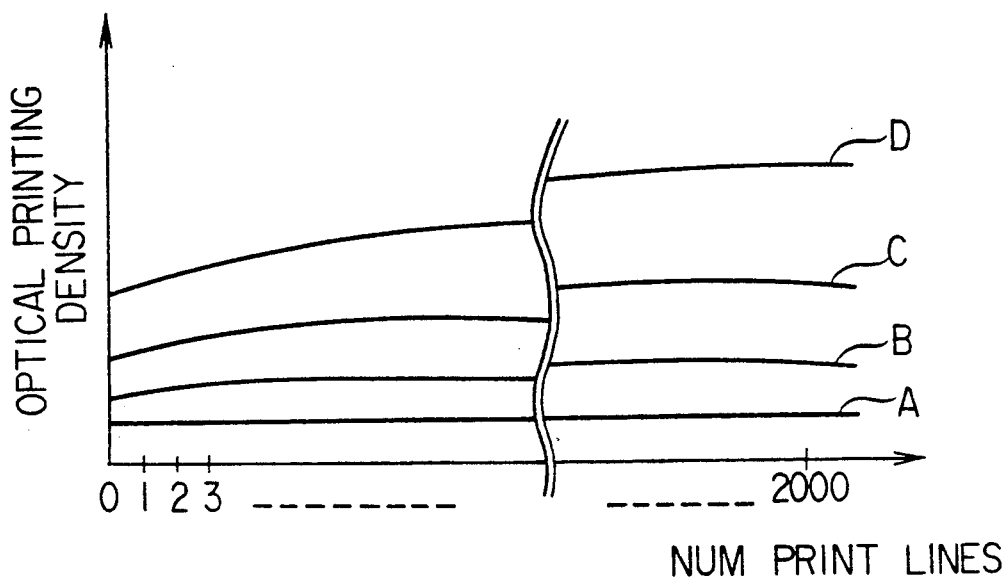
FIG. 20 is a graph showing the relationships between the number of printing lines and the density of printing.
FIG. 22 is a table showing the corresponding relationships between gradation level signals and heat accumulation indices in the fifth embodiment.

FIG. 20 is a graph showing relationships between the number of printing lines and the density of printing. In FIG. 20, the abscissa axis represents the number of printing lines, while the ordinate axis represents the optical printing density. Characteristic curves A, B, C and D correspond to cases where the whole areas were printed at Gradation Levels "8," "16," "32" and "64," respectively.

First, the principles of this embodiment will be described with reference to FIG. 20.

In the case where the whole area is printed at Gradation Level "8," the optical printing density hardly fluctuates as indicated by the characteristic curve A in FIG. 20 because heat is hardly accumulated in spite of increase in the number of printing lines. As indicated by the characteristic curves B, C and D in FIG. 20, however, in the cases where the whole areas are printed at Gradation Levels "16", "32" and "64", the printing densities fluctuate drastically because more heat is accumulated at a higher gradation level.

When, in this manner, the characteristics of the optical printing density versus the number of printing lines are sought with the gradation levels as a parameter, strictly speaking, only the characteristic curves in the number of the gradation levels are obtained. However, the characteristic curves include some that may be regarded as exhibiting the same characteristics, and they can be classified into several groups.

In this invention, gradation level signals L are classified into a plurality of groups the number of which is not larger than that of the gradation levels, and a heat accumulation index S1 is assigned to each group. Here, the heat accumulation index S1 is a value which denotes the quantity of unnecessary heat accumulation remaining in the heating resistor when one dot is printed, and the quantity of heat accumulation in the thermal head 7B can be expressed by calculating the heat accumulation indices S1. More specifically, when the heat accumulation index S1 is equal to or greater than a predetermined value, the quantity of heat accumulation in the thermal head 7B increases every printing step. Therefore, the heat accumulation indices S1 are added and cumulated. On the other hand, when the heat accumulation index S1 is less than the predetermined value, the quantity of heat accumulation in the thermal head 7B decreases owing to heat radiation. Therefore, the heat accumulation index S1 is subtracted.

In this invention, the heat accumulation indices S1 are calculated with the lapse of printing as described above, and a strobe signal S6 (in FIG. 19) is corrected on the basis of the result of the calculation. Further, the values of the heat accumulation indices S1 stated above can be readily found through heat analysis or experiment.

Next, the operation of the above embodiment will be described with reference to Table 1 and Table 2 below. Table 1 indicates the relationships between the gradation level and the heat accumulation index S1, while Table 2 indicates the relationships between a cumulative heat accumulation index S5 and a correction coefficient K.

Any of the gradation level signals L having Gradation Levels 1-64 and configured by 6 bits for example, is applied to the input terminal T, and is converted into the heat accumulation index S1 by the gradation level decision means 1B. In the gradation level decision means 1B, the quantity of heat accumulated by the printing of one dot is decided.

More specifically, the gradation level signals L are classified into four groups, and the heat accumulation index S1 (index indicative of the quantity of heat accumulation) set every group is output. As seen from Table 1, if the gradation level of the gradation level signal L is "1"-"8" or "33"-"64" by way of example, the heat accumulation index S1 of "0" or "4" is output to the heat accumulation index-counter 2B at the succeeding stage.

TABLE 1

| Group | Gradation Level | Heat Accumulation Index S1 |
|---|---|---|
| 1 | 1-8 | 0 |
| 2 | 9-16 | 1 |
| 3 | 17-32 | 2 |
| 4 | 33-64 | 4 |

Subsequently, the heat accumulation indices S1 are counted every line by the heat accumulation index-counter 2B, and the count value S2 is supplied to the heat accumulation index-decision means 3B and the heat accumulation index-calculation means 5B at the succeeding stages.

The count value S2 is compared by the heat accumulation index-decision means 3B with a reference value S3 which is supplied from the reference level generator 4B, and if the count value S2 is at least equal to the reference value S3 or is smaller than the same, a decision signal S4 of "1" or "0" is output to the heat accumulation index-calculation means 5B at the succeeding stage.

Further, the count value S2 involved from the start of printing till a printing line concerned is calculated by the heat accumulation index-calculation means 5B. More specifically, in a case where the decision signal S4 is "1", the quantity of heat accumulation increases, and hence, the count value S2 supplied from the heat accumulation index-counter 2B is added by the heat accumulation index-calculation means 5B, with the result that the cumulative heat accumulation index S5 is output to the pulse generation means 6B at the succeeding stage. In contrast, in a case where the decision signal S4 is "0", the quantity of heat accumulation is decreased by heat radiation, and hence, the count value S2 is subtracted by the heat accumulation index-calculation means 5B, with the result that the cumulative heat accumulation index S5 is similarly output to the pulse generation means 6B.

Then, the cumulative heat accumulation index S5 is referred to, whereupon the strobe signal S6 of pulses in a number N, which corresponds to the gradation level signal L, namely, with which the optical printing density of the identical gradation level signal L is held constant, is generated by the pulse generation means 6B and is applied to the thermal head 7B.

As indicated in Table 2, the cumulative heat accumulation indices S5 are classified into 16 groups by way of example, and the correction coefficient K for correcting the quantity of heat accumulation is set for every group. The pulse number N of the strobe signal S6 corresponding to the gradation level signal L is corrected on the basis of the correction coefficient K, thereby to optimize the quantity of heating, i.e., the energization or heating time of each heating resistor constituting the thermal head 7B.

TABLE 2

| Group | Cumulative Heat Accumulation Index S5 | Correction Coefficient K |
|---|---|---|
| 1 | 0 –4096 | 1.00 |
| 2 | 4097 –18192 | 0.98 |
| ʃ | ʃ | ʃ |
| 14 | 6770246 –7447271 | 0.83 |
| 15 | 7447272 –8191999 | 0.82 |
| 16 | 8192000 or above | 0.81 |

In the fourth embodiment, the number of groups and the heat accumulation indices S1 for the gradation levels, and the number of groups and the correction coefficients K for the cumulative heat accumulation indices S5 have been respectively set as listed in Table 1 and Table 2. However, the respective values differ depending upon the characteristics of the thermal head 7B, etc. and are not restricted to the set values.

In addition, although in the fourth embodiment the number N of the pulses of the strobe signal S6 has been corrected, it is needless to say that the intended object can be accomplished even by correcting the width of pulse.

Also, in the fourth embodiment, the heat accumulation indices S1 have been counted in single-line units. However, the indices S1 may well be counted in multiple-line units, and a similar operation can be expected even when one line is divided into a plurality of units and the indices S1 are counted in divided units.

Further, although in the fourth embodiment the heat accumulation indices S1 have been cumulated since the start of printing till the pertinent printing line, it is needless to say that the intended object can be accomplished even when the indices S1 are cumulated till a position which precedes the pertinent printing line a plurality of lines.

Embodiment 5

Figure 21:
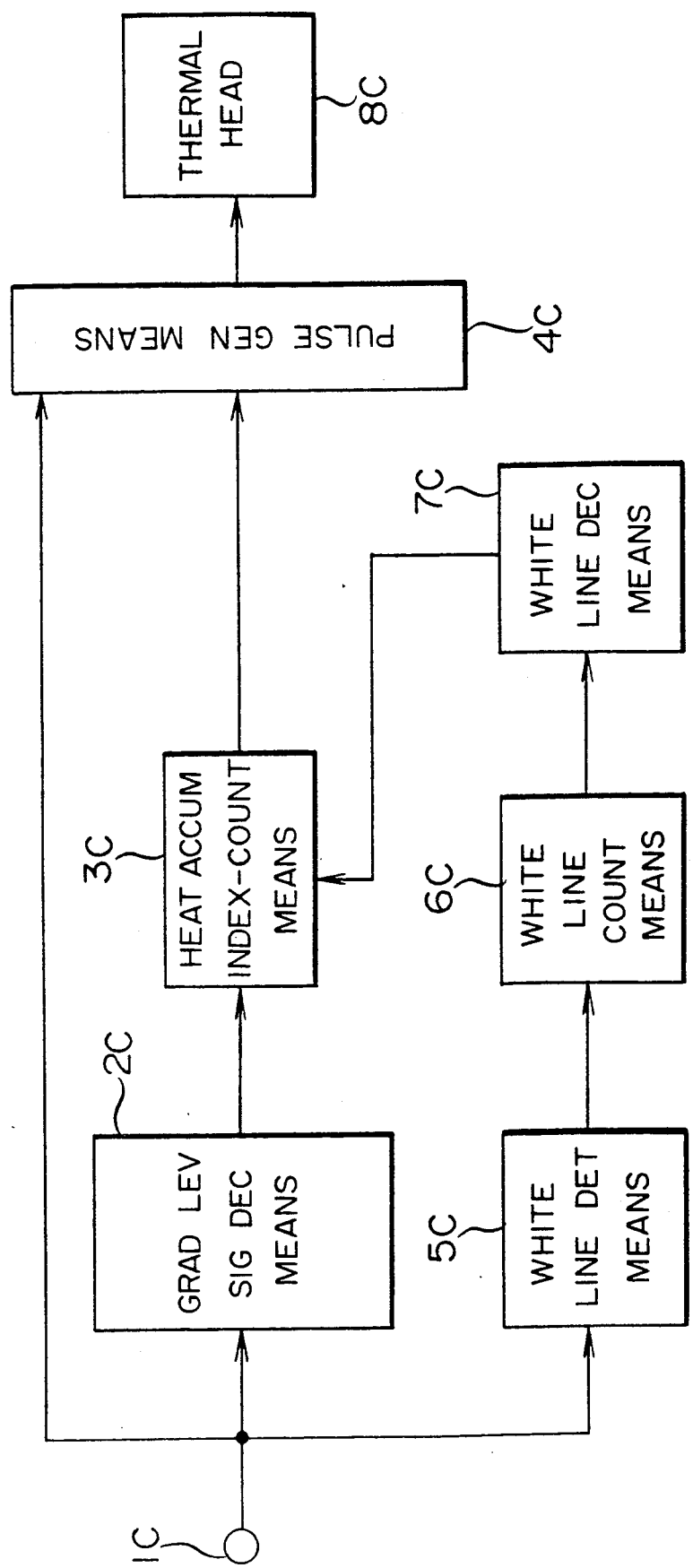
FIG. 21 is a block diagram showing a halftone printing system which is the fifth embodiment of this invention.

FIG. 21 is a block diagram showing the fifth embodiment of this invention. Referring to the figure, a gradation level signal S configured of, for example, 6 bits is applied from an input terminal 1C to pulse generation means 4C and gradation level signal-decision means 2C to be described later. The gradation level signals S are classified into 4 groups by way of example, and an index (hereinbelow, termed the "heat accumulation index") indicative of a certain predetermined quantity of heat accumulation is set for each of the groups. Here, the heat accumulation index is a value indicating the unnecessary quantity of heat which remains in a heating resistor constituting a thermal head when one dot has been printed, and such values can be obtained on the basis of an appropriate heat calculation or the experiment of printing operations. Also, the gradation level signal-decision means 2C delivers a heat accumulation index signal corresponding to the decided result thereof. Heat accumulation index-count means 3C is connected at the stage succeeding the gradation level signal-decision means 2C. It counts the heat accumulation index signals each being output from the gradation level signal-decision means 2C every printing operation corresponding to one line, and it delivers a cumulative heat accumulation index signal configured of, for example, 4 bits and applies it to the pulse generation means 4C at the succeeding stage. The pulse generation means 4C generates a required number of heating pulses corresponding to the gradation level signal S to-be-processed while referring to the cumulative heat accumulation index signal from the cumulative heat accumulation index-count means 3C.

On the other hand, the gradation level signals S are applied also to white line detection means 5C. Here, each time a continuous white line is detected, a corresponding signal is applied to white line count means 6C at the succeeding stage. White line decision means 7C is interposed between the white line count means 6C and the heat accumulation index-count means 3C. The white line decision means 7C is a kind of comparison means, and it delivers a signal "H" (high) when the output of the white line count means 6C has exceeded a preset value. In addition, a thermal head 8C is configured of heating resistors (not shown) in a number of, for example, 1024, and it is connected at the stage succeeding the pulse generation means 4C.

Before the description of the operation of the fifth embodiment of this invention shown in FIG. 21, the principle of a halftone printing operation will be described with reference to FIG. 20 concerning the fourth embodiment.

First, in a case where the whole area is printed at Gradation Level 8, the optical printing density does not change in spite of increase in the number of printing lines as indicated by a curve A. Signified here is that, since the heating resistors constituting the thermal head are caused to generate heat at the low gradation level, the quantity of heat accumulation thereof is almost equal to zero.

Secondly, in a case where the whole area is printed at Gradation level 16, the optical printing density somewhat changes with increase in the number of printing lines as indicated by a curve B.

Also, in a case where the whole area is printed at Gradation Level 32, the printing density undergoes a considerable change with increase in the number of printing lines as indicated by a curve C. This is because the quantity of heat accumulation in the heating resistors constituting the thermal head becomes considerably large.

Further, in a case where the whole area is printed at Gradation Level 64, the degree of the increase of the quantity of heat accumulation in the heating resistors constituting the thermal head becomes drastic with increase in the number of printing lines as indicated by a curve D, with the result that the printing density rises more sharply.

As recognized from the foregoing, when characteristic curves indicating the relationships between the optical printing density and the number of printing lines are sought with the gradation levels as a parameter, they are strictly obtained in a number equal to that of the gradation levels. However, the characteristic curves include ones which may be deemed to represent substantially the same characteristics, and they can be classified into a certain proper number of groups by handling the curves of substantially the same characteristics collectively.

This invention has been made with note taken of the above fact. More specifically, according to this invention, gradation level signals of a plurality of (N) gradation levels are classified into a suitable number of (n) groups (where $N \geq n$ holds), and a heat accumulation index is previously set for every group, while required counting is performed every line from the point of time of the start of printing till the point of time immediately preceding an actual operation on the pertinent printing line, and an heating pulse signal for the pertinent printing line is appropriately corrected on the basis of the counted result.

FIG. 22 is a diagram showing the correlation table (hereinbelow, termed "Table 1C") of the heat accumulation indices versus the gradation level signal groups, for explaining the operation of the fifth embodiment. Here, the number N is set at 64, and the number n is set at 4.

FIG. 23 is a diagram showing the correlation table (hereinbelow, termed "Table 2C") of correction coefficients versus cumulative heat accumulation index groups, for explaining the operation of the fifth embodiment. Here, the cumulative heat accumulation indices are classified into 16 groups.

Also, FIG. 24 is a diagram showing the partial correlation table (hereinbelow, termed "Table 3C") of the numbers of heating pulses at the respective gradation levels versus the cumulative heat accumulation index groups and the corresponding correction coefficients, for explaining the operation of the fifth embodiment.

Next, the operation of the fifth embodiment of this invention will be described by referring principally to FIG. 21. It is now assumed that the gradation level signals as input signals, each corresponding to any of Gradation Levels 1-64, are successively applied from the input terminal 1C to the gradation level signal-decision means 2C, the pulse generation means 4C and the white line detection means 5C.

The signal applied to the gradation level decision means 2C is used for deciding the extent of the quantity of heat accumulation based on the printing of a certain dot.

Here, FIG. 22 (namely, Table 1C) is also referred to. By way of example, when the applied gradation level signal is contained in the group of Levels 1-8, the heat accumulation index of 0 (zero) corresponding thereto is delivered from the gradation level decision means 2C. Likewise, when the applied gradation level signal is contained in the group of Levels 33-64 by way of example, the heat accumulation index of 1 corresponding thereto is delivered from the gradation level decision means 2C.

In the heat accumulation index-count means 3C, the heat accumulation indices delivered from the gradation level signal-decision means 2C at the preceding stage are counted every line from the point of time of the start of printing till the point of time immediately preceding an actual operation on the printing line. Then, a signal which corresponds to a cumulative heat accumulation index as the counted result is produced and is applied to the pulse generation means 4C at the succeeding stage. In the pulse generation means 4C, the applied cumulative heat accumulation index is referred to, so as to supply the thermal head 8C with the heating pulses in a number optimalized in order that the density of printing at the same gradation level as the gradation level signal, the input signal at the input terminal 1C, may be held constant.

FIG. 23 (namely, Table 2C) and FIG. 24 (namely, Table 3 C) serve to elucidate aspects in each of which the heating pulses in the optimalized number are generated. First, as understood from the contents of Table 2C, the cumulative heat accumulation indices are classified into 16 groups, and the correction coefficients of the respective groups are stipulated. Next, as understood from the contents of Table 3C, the numbers of heating pulses for the respective gradation levels corresponding to each of the stipulated correction coefficients are set. It is now assumed that a printing operation at Gradation Level 6 is being executed, and that the cumulative heat accumulation index applied to the pulse generation means 4C is, for example, 10000. Then, the correction coefficient corresponding to this situation is controlled to 0.98 in view of the contents of Table 2C. Further, the optimum number of heating pulses is controlled to 31 in view of the contents of Table 3C.

According to the fifth embodiment of this invention, as described above, the heat accumulation indices in dot unit from the point of time of the start of printing till the point of time immediately preceding the actual operation on the pertinent printing line are cumulated every line, whereby the quantity of heat accumulation in the thermal head can be properly corrected with the progress of the operation since the start of the printing.

Here will be described a case where a continuous white line has arisen, which is a special case in the printing operation. It is now assumed that the gradation level signals are being applied from the input terminal 1C to the white lines detection means 5C. The white line detection means 5C detects whether or not the corresponding line is a white line, on the basis of the applied gradation level signals. Then, a signal corresponding to the result of the detection is applied to the white line count means 6C at the succeeding stage. In the white line count means 6C, a built-in white line counter is caused to count up when the received signal indicates that the pertinent line is a white line, whereas the white line counter has its content cleared when the received signal indicates that the pertinent line is not a white line. Subsequently, an output from the white line count means 6C is applied to the white line decision means 7C at the succeeding stage. The white line decision means 7C decides whether or not the count value of the white lines being the output of the white line count means 6C is, at least, equal to a certain predetermined value (criterion value) M. When it has been decided that the count value is, at least, equal to the predetermined value M, the decision means 7C applies the "H" signal to the heat accumulation index-count means 3C. In contrast, when it has been decided that the count value is less than the predetermined value M, an "L" (low) signal is applied. Then, upon receiving the "H" signal, the heat accumulation index-count means 3C reduces the cumulative heat accumulation index and increases the number of heating pulses at the pertinent printing line from that of the point of time immediately preceding the continuous white line. On the other hand, upon receiving the "L" signal, the heat accumulation index-count means 3C continues the ordinary operation of cumulating the heat accumulation indices and supplies the pulse generation means 4C with a signal corresponding to the required cumulative heat accumulation index.

As understood from the foregoing, if the white line continues, the quantity of heat accumulation in the thermal head decreases on the basis of heat radiation from the thermal head. Therefore, the cumulative heat accumulation index corresponding to the decrement of the quantity of heat accumulation is subtracted from the cumulative heat accumulation index arising from the point of time of the start of printing till the point of time immediately preceding the actual operation on the pertinent printing line, whereby the heating pulses are appropriately corrected with the lapse of the printing operation.

Incidentally, in the fifth embodiment, the numbers of groups into which the gradation level signals and the cumulative heat accumulation indices are classified, the heat accumulation indices, the correction coefficients, the criterion of the white line, etc. are determined on the basis of the various characteristics of the thermal head to be used. In addition, although the fifth embodiment has been described for cases where the change of the quantity of heat accumulation in the thermal head is dealt with by correcting the number of the heating pulses, the embodiment is not limited thereto, but a similar effect can be achieved even when the change is dealt with by, for example, correcting the pulse width of an heating pulse. Further, although the fifth embodiment has been described as correcting the accumulation of heat in the thermal head, the accuracy of the control can be enhanced in such a way that the function of correcting an ambient temperature in a broader sense, for example, is added to the correcting function described. Besides, the white line need not be entirely white, but substantially the same effect can be achieved even when the white line contains some black information. Moreover, although the fifth embodiment has been described as adding the heat accumulation indices in printing line units, this is not restrictive, as a similar effect can be achieved even by, for example, adding the indices every few lines or dividing a single line into a plurality of sections and then adding the indices for every section.

What is claimed is:

1. A halftone printing system having a thermal head including a plurality of heating resistors which are selectively heated in accordance with printing data signals to print a dot pattern, each of the data signals having a gradation level indicating the printing density of a dot in the dot pattern, comprising:

a reference signal generator for generating a reference signal indicating a reference gradation level;

decision means responsive to the reference signal and the data signals for deciding if the gradation level of each data signal is greater than or equal to the reference gradation level;

a counter responsive to the decision means for counting the number of data signals having a gradation level greater than or equal to the reference gradation level; and a pulse generator responsive to the data signals and the counter for generating one or more pulses for the thermal head for each dot, the pulses for any given dot corresponding to the gradation level of the data signal for the given dot and the number counted by the counter during a period including a plurality of printed lines.

2. A halftone printing system as claimed in claim 1 further comprising a temperature sensor mounted on the thermal head for sensing the temperature of the thermal head, wherein the pulse generator includes means responsive to the temperature sensor for adjusting the pulses for the thermal head based on the temperature sensed by the temperature sensor.

3. A halftone printing system as claimed in claim 1 wherein the pulse generator comprises means for generating a plurality of pulses corresponding to each data signal, the number of pulses decreasing as the number counted by the counter increases.

4. A halftone printing system as claimed in claim 1 wherein the pulse generator comprises means for generating at least one pulse corresponding to each data signal, the pulse having a pulse width which decreases as the number counted by the counter increases.

5. A halftone printing system as claimed in claim 1 wherein the period includes only lines that have already been printed by the printing system.

6. A halftone printing system comprising:
   an input terminal for receiving a plurality of data signals, each of the signals having a gradation level indicating the printing density of a dot in a dot pattern;
   a line memory connected to the input terminal for storing data signals corresponding to one printed line;
   first decision means connected to the input terminal for selecting from at least three different groups a group into which the gradation level of each data signal falls and assigning each data signal a corresponding group number;
   second decision means connected to the line memory for selecting from the plurality of groups a group into which the gradation level of each data signal in the line memory falls and assigning each data signal a corresponding group number;
   a first shift register for storing a plurality of group numbers from the first decision means;
   a second shift register for storing a plurality of group numbers from the second decision means;
   a thermal head comprising a plurality of heating resistors; and
   a pulse generator responsive to the data signals and the first and second shift registers for generating drive pulses for the thermal head corresponding to the data signals and a weighted sum of the group numbers stored in the first and second shift registers.

7. A halftone printing system for printing a dot pattern based on data signals each having a gradation level indicating the printing density of a dot in the dot pattern comprising:
   means for receiving data signals and assigning a heat accumulation index to each data signal based on the gradation level of each signal;
   an index counter for calculating a first sum of the heat accumulation indices for a each data signal in a group comprising a plurality of the data signals;
   decision means for determining if the first sum exceeds a reference level;
   calculating means responsive to the decision means and the index counter for calculating a cumulative heat accumulation index which is the total of the first sums greater than or equal to the reference value minus the total of the first sums less than the reference value during a period including a plurality of printed lines;
   a thermal head comprising a plurality of heating elements; and
   a pulse generator responsive to the data signals and the calculating means for generating drive pulses for the thermal head corresponding to the gradation level of the data signals and the cumulative heat accumulation index.

8. A halftone printing system as claimed in claim 7 wherein the first sum counted by the index counter is the sum of the heat accumulation indices for the data signals corresponding to a single printed line.

9. A halftone printing system for printing a dot pattern based on data signals each having a gradation level indicating the printing density of a dot in the dot pattern comprising:
   decision means for receiving data signals and assigning a heat accumulation index to each data signal based on the gradation level of each signal;
   an index counter for calculating a first sum of the heat accumulation indices for each data signal in a group comprising a plurality of the data signals;
   calculating means responsive to the index counter for calculating a cumulative heat accumulation index which is the sum of the first sums for a plurality of printed lines;
   a thermal head comprising a plurality of heating elements; and
   a pulse generator responsive to the data signals and the calculating means for generating drive pulses for the thermal head corresponding to the gradation levels of the data signals and the cumulative heat accumulation index.

10. A halftone printing system as claimed in claim 9 further comprising:
    a white line detector for detecting a white line in the data signals; and
    a white line counter responsive to the white line detector for counting the number of continuous white lines;
    wherein the calculating means includes means for decreasing the cumulative heat accumulation index when the number of continuous white lines exceeds a prescribed value.

11. A halftone printing system as claimed in claim 9 wherein each group of data signals comprises all the data signals for a single printed line.

* * * * *

UNITED STATES PATENT AND TRADEMARK OFFICE
CERTIFICATE OF CORRECTION

PATENT NO. : 5,131,767

DATED : July 21, 1992

INVENTOR(S) : Yamada et al.

It is certified that error appears in the above-identified patent and that said Letters Patent is hereby corrected as shown below:

Claim 7, column 17, line 55, delete "a" (first occurrence).

Signed and Sealed this

Fifth Day of October, 1993

Attest:

BRUCE LEHMAN

*Attesting Officer*     *Commissioner of Patents and Trademarks*